US011580239B2

(12) United States Patent
Carroll, Jr. et al.

(10) Patent No.: US 11,580,239 B2
(45) Date of Patent: Feb. 14, 2023

(54) CONTROLLING ACCESS TO CLOUD RESOURCES IN DATA USING CLOUD-ENABLED DATA TAGGING AND A DYNAMIC ACCESS CONTROL POLICY ENGINE

(71) Applicant: Microsoft Technology Licensing, LLC, Redmond, WA (US)

(72) Inventors: Daniel John Carroll, Jr., Columbia, MD (US); Kameshwar Jayaraman, Redmond, WA (US); Stuart Kwan, Redmond, WA (US); Kartik Tirunelveli Kanakasabesan, Sammamish, WA (US); Shefali Gulati, Redmond, WA (US); Charles Glenn Jeffries, Sammamish, WA (US); Ganesh Pandey, Redmond, WA (US); Roberto Carlos Taboada, Duvall, WA (US); Parul Manek, Redmond, WA (US); Steven Mark Silverberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/660,275

(22) Filed: Oct. 22, 2019

(65) Prior Publication Data
US 2021/0117561 A1     Apr. 22, 2021

(51) Int. Cl.
*H04L 9/00* (2022.01)
*G06F 21/62* (2013.01)
(Continued)

(52) U.S. Cl.
CPC .......... *G06F 21/6218* (2013.01); *G06F 9/451* (2018.02); *G06F 9/5072* (2013.01);
(Continued)

(58) Field of Classification Search
CPC ............................. G06F 21/6218; G06F 9/451
(Continued)

(56) References Cited

U.S. PATENT DOCUMENTS 7,831,570 B2   11/2010   Sack et al.
8,752,045 B2   6/2014   Fitzgerald et al.
(Continued)

OTHER PUBLICATIONS

"Attribute-Based Access Control", Retrieved from: https://developer.okta.com/books/api-security/authz/attribute-based/#authz-attribute-based, Retrieved Date: Sep. 15, 2019, 5 Pages.
(Continued)

*Primary Examiner* — Christopher J Brown
(74) *Attorney, Agent, or Firm* — Christopher J. Volkmann; Kelly, Holt & Christenson, PLLC (57) ABSTRACT

Access to data and resources in a multi-tenant computing system is managed by tagging the data and resources with attributes, as well as by tagging users with attributes. Tenant-specific access policies are configured. When an access request is received from a workload, a policy decision engine processes the attributes that are tagged to the requesting workload (e.g., user, application, etc.) as well as those tagged to the requested data or resource, given a relevant tenant-specific policy. An access decision is provided in response to the access request, and the access decision can be enforced by a tenant-specific enforcement system.

20 Claims, 8 Drawing Sheets

(51) Int. Cl.
*G06F 9/451* (2018.01)
*G06F 9/50* (2006.01)
*G06F 21/31* (2013.01)
*G06F 21/60* (2013.01)

(52) U.S. Cl.
CPC ............ *G06F 21/31* (2013.01); *G06F 21/602* (2013.01); *G06F 2221/2141* (2013.01)

(58) Field of Classification Search
USPC ......................................................... 726/28
See application file for complete search history.

(56) References Cited

U.S. PATENT DOCUMENTS

| | | | | |
|---|---|---|---|---|
| 8,788,815 | B1* | 7/2014 | Garcia | ................ H04L 63/0869 |
| | | | | 713/165 |
| 9,349,019 | B2 | 5/2016 | McClendon | |
| 9,438,506 | B2* | 9/2016 | Ryland | .................... H04L 63/10 |
| 9,530,020 | B2* | 12/2016 | Brandwine | ......... G06F 21/6218 |
| 9,971,613 | B2 | 5/2018 | Yang | |
| 10,628,388 | B2* | 4/2020 | Joshi | .................. G06F 16/2455 |
| 2009/0307744 | A1 | 12/2009 | Nanda et al. | |
| 2015/0200941 | A1 | 7/2015 | Muppidi et al. | |
| 2015/0205602 | A1* | 7/2015 | Prismon | .................. H04L 67/34 |
| | | | | 717/121 |
| 2017/0099181 | A1 | 4/2017 | Hawking et al. | |
| 2019/0268328 | A1 | 8/2019 | Hussein et al. | |
| 2019/0387072 | A1* | 12/2019 | Jamkhedkar | ........ H04L 67/1089 |
| 2020/0007455 | A1* | 1/2020 | Chhabra | ............. H04L 41/0893 |
| 2020/0097673 | A1* | 3/2020 | Cai | ....................... H04L 63/104 |
| 2020/0120098 | A1* | 4/2020 | Berg | ..................... H04L 63/101 |

OTHER PUBLICATIONS

"Managing Tag Defaults", Retrieved from: https://web.archive.org/web/20190714123959/https:/docs.cloud.oracle.com/iaas/Content/Identity/Tasks/managingtagdefaults.htm, Jul. 14, 2019, 6 Pages.

Shah, Sulay, "Simplify Granting Access to Your AWS Resources by Using Tags on AWS IAM Users and Roles", Retrieved from: https://aws.amazon.com/blogs/security/simplify-granting-access-to-your-aws-resources-by-using-tags-on-aws-iam-users-and-roles/, Nov. 19, 2018, 6 Pages.

"E-Security Begins with Sound Security Policies", In Symantec Enterprise Security, Jun. 14, 2001, 23 Pages.

"International Search Report and Written Opinion Issued in PCT Application No. PCT/US20/055644", dated Feb. 10, 2021, 15 Pages.

* cited by examiner

CONTROLLING ACCESS TO CLOUD RESOURCES IN DATA USING CLOUD-ENABLED DATA TAGGING AND A DYNAMIC ACCESS CONTROL POLICY ENGINE

BACKGROUND

Computing systems are currently in wide use. Many computing systems host services that are accessed by multiple different tenants. Each tenant may be a separate organization, so that the data and some resources for the different tenants are maintained in isolation from one another.

In some current systems, organizations store relatively large amounts of structured and unstructured data in remote server environments (such as in cloud-based data stores that are accessed through hosted data store services). Tenants often store data directly to cloud storage systems, and also through software applications that are cloud-enabled applications.

At the same time, it is not uncommon for such tenants to have a relatively large number of users that need to access the data. As these users spend time in the organization corresponding to the tenant, their roles and project responsibilities can change, expand, and retract. Similarly, at different points during the lifecycle of a project, the organization may wish to enable collaboration between different groups in the organization. This may naturally lead to expansion and contraction of the scope of the audience that needs access to data, as well as the types of access needed, at different times.

The discussion above is merely provided for general background information and is not intended to be used as an aid in determining the scope of the claimed subject matter.

SUMMARY

Access to data and resources in a multi-tenant computing system is managed by tagging the data and resources with attributes, as well as by tagging users with attributes. Tenant-specific access policies are configured. When an access request is received from a workload, a policy decision engine processes the attributes that are tagged to the requesting workload (e.g., user, application, etc.) as well as those tagged to the requested data or resource, given a relevant tenant-specific policy. An access decision is provided in response to the access request, and the access decision can be enforced by a tenant-specific enforcement system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, tenants that use a multi-tenant computing system often need to add, change, or remove access to data and resources, over time. Currently, the access is often managed through a role-based access control (RBAC) system where users are added into role groups, and the role groups are given permissions to access various data. Also, it is not uncommon for an access control list (ACL) to be attached to the data, itself, to which a group will be added.

However, these types of systems place multiple burdens on content creators and resource owners. For example, the content creators and resource owners must understand, manage and maintain group membership, and nested group permissions. Over time, the membership tends to become stale, and so it becomes difficult to trace actual permissions that exist for a given item of content or for a given resource. In addition, content and resource creators and owners must understand the permissions that are granted to each group, and the implication of changing permissions. This normally means that the control of these permissions is delegated to an administrative user, or to a content owner who understands security postures and configuration within their own environment. This is very cumbersome, and time consuming, and can be error prone in that erroneous permissions can be granted or maintained, when they should not be. In addition, if a user changes projects or roles, it is incumbent on the administrator to have knowledge of all the groups the user has been added to and take appropriate action to remove the user from groups which the user no longer should have access to, which is also administratively difficult and prone to overlooking groups resulting in the user having permission to objects or resources that the user should have had revoked.

The present discussion thus proceeds with respect to an attribute-based access control (ABAC) computing system that allows tags or attributes to be defined and attached to different users, environments, devices, computing system resources, and data. This is done in a multi-tenant way so that the tags and mapping can be done on a tenant-specific basis. Also, a multi-tenant policy resource/storage system stores tenant-specific policies that are used to grant access, given the tags or attributes attached to the items involved in a specific request for access. A policy decision system is deployed in a trusted execution environment. It obtains relevant policies and attributes (or tags) that are relevant to any given access request and a process decision engine reasons over the tags or attributes, given the relevant policies, to render an access request decision. The decision can grant or deny access, and it can also identify actions that are permitted, when access is granted.

Figure 1:
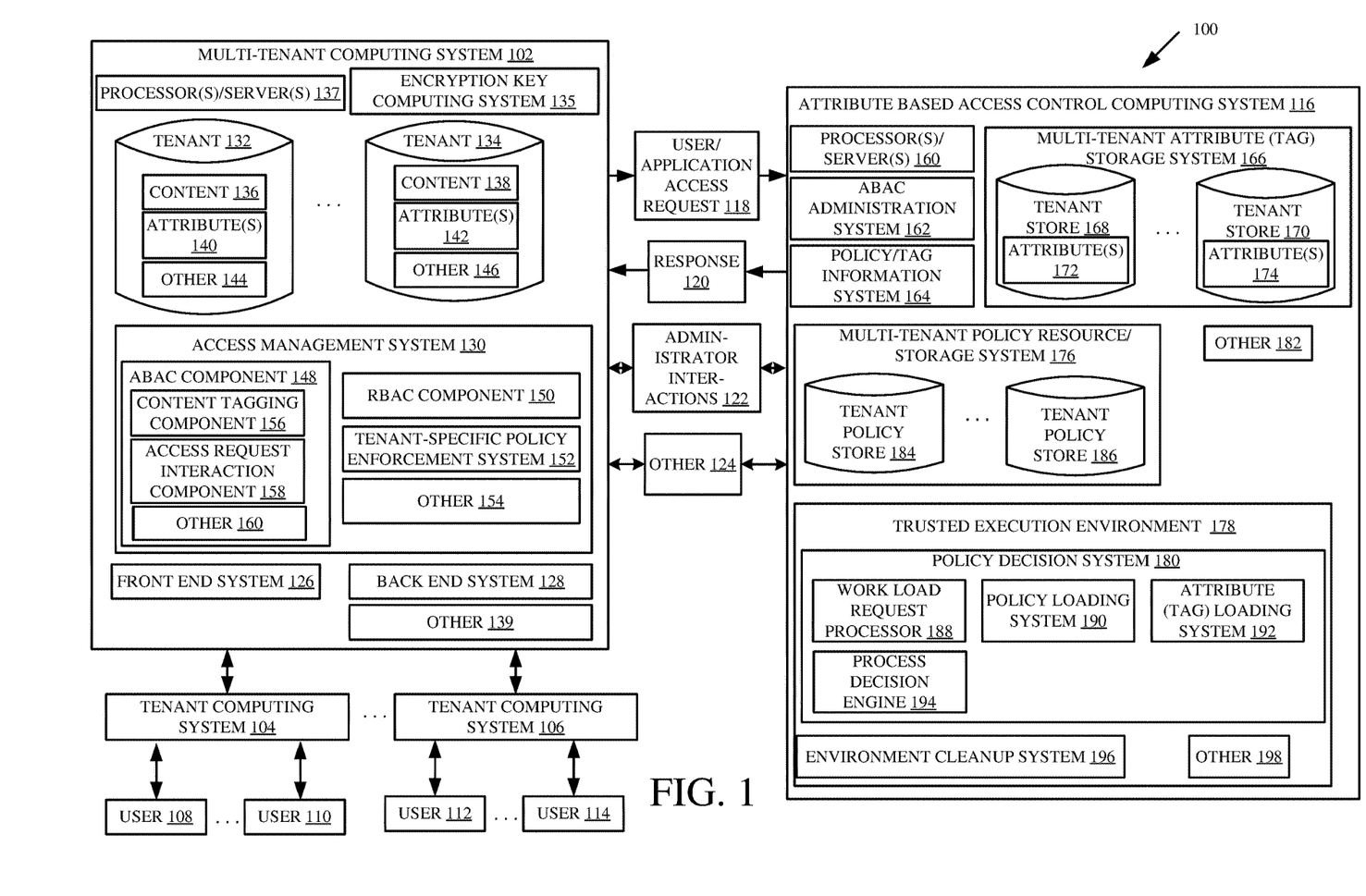
FIG. 1 is a block diagram of one example of a computing system architecture in which attribute-based access control (ABAC) is provided.

FIG. 1 is a block diagram showing one example of a computing system environment 100 in which multi-tenant computing system 102 can be accessed by a variety of different tenant computing systems 104-106, each of which may correspond to a different tenant, and each of which may have a plurality of different users 108-110, and 112-114, respectively. The multi-tenant computing system 102 can host services (such as data storage services, application services, or other services) for the tenants who use computing systems 104 and 106. Thus, tenant computing systems 104 and 106 may access multi-tenant computing system 102 over a network (e.g., a wide area network, a local area network, a cellular network, or variety of other networks or combinations of networks).

FIG. 1 also shows that multi-tenant computing system 102 communicates with attribute-based accessed control (ABAC) computing system 116. In FIG. 1, ABAC computing system 116 is shown separately from computing system 102, but this is just one example. It can be hosted inside system 102 as well. Other architectures are also contemplated herein. As is described in greater detail below, when a user 108-114, or an application, or another workload requests access to data or resources of a particular tenant, multi-tenant computing system 102 makes an access request 118 indicative of the user or application or other workload that is requesting access to a particular set of data or resources. ABAC computing system 116 illustratively generates a response 120 to request 118 indicating whether the requested access is granted or denied. It can also identify the particular actions that are permitted, if that request is granted.

FIG. 1 also shows that an administrative user can access ABAC computing system 116 either through multi-tenant computing system 102, or directly. This is indicated by administrative interactions 122. The administrative interactions 122 can be processed by ABAC computing system 116 to configure the various tags or attributes that are used by a particular tenant, to make mappings of those tags or attributes to users, environments, devices, data, computing system resources, etc., and to configure access control policies that will be used for that particular tenant.

FIG. 1 shows that multi-tenant computing system 102 and ABAC computing system 116 can interact in other ways as well. This is indicated by block 124.

Before describing the overall operation of architecture 100 in more detail, a brief description of some of the items in architecture 100, and their operation, will first be provided. Multi-tenant computing system 102 illustratively has one or more processors or servers 137 that implement a front-end system 126, a back-end system 128, access management system 130, and a plurality of tenant-specific data stores 132-134. Each data store 132-134 can include content 136-138, respectively. The content can have corresponding tags or attributes 140-142, respectively. The tags or attributes 140-142 can be stored along with the corresponding content 136-138, or they can be stored separately. They are shown being stored along with the content for the sake of example only. Each tenant-specific data store 132-134 can also store a wide variety of other information 144-146, respectively.

Front-end system 126 illustratively exposes an interface that can be accessed by the different tenant computing systems 104-106. Users 108-110 and 112-114 can use the tenant computing systems 104-106 to interact with those interfaces, to provide inputs through front-end computing system 126 to request access to, and perform operations on, the content 136-138 (which can be data, other computing system resources, such as a piece of cloud infrastructure, etc.) for the corresponding tenant. Those requests are passed to back-end system 128 which can perform the desired actions on the content for which access is requested. Before the operations are performed, however, access management system 130 illustratively performs access management tasks to determine whether the requested access and operations can be granted, and performed, respectively.

Multi-tenant computing system 102 also illustratively includes encryption key computing system 135. Encryption key computing system 135 can be used when encryption keys are needed to access various items of content. It can issue encryption keys or withhold encryption keys. It can provide an access request to ABAC computing system 116 asking whether an encryption key should be issued to a requestor. Thus, ABAC computing system 116 can receive access requests 118 not only generated from end users 108-114, or administrative users, or applications on multi-tenant computing system 102, but also from other workloads, such as encryption key computing system 135.

In the example shown in FIG. 1, access management system 130 illustratively includes ABAC component 148, role-based access control (RBAC) component 150, tenant-specific policy enforcement system 152, and it can include a wide variety of other items 154. ABAC component 148, itself, can include content tagging component 156, access request interaction component 158, and it can include other items 160.

Content creators, and administrative users, can use the content tagging component 156 to generate and apply tags to various items of content. Administrators can also illustratively create and apply tags to other items, such as environments, devices, etc.

When an access request is made, access request interaction component 158 illustratively handles interactions with ABAC computing system 116 by providing the access request 118, and receiving the response 120. It can provide the response to tenant-specific policy enforcement system 152. Different tenants may choose to handle different responses 120, differently. For instance, one tenant may desire that a response that denies access to an item of content generate an explanatory message indicating why access was denied. Another tenant may desire that the response simply return an error message, or simply not perform the requested access. These are just examples, and tenant-specific policy enforcement system 152 can be configured on a tenant-specific basis, on an application-specific basis, or in other ways.

RBAC component 150 can perform conventional role-based access control or other types of access control. Thus, when an access request is received, access management system 130 can perform a plurality of different types of access control, by way of example.

ABAC computing system 116, in the example shown in FIG. 1, includes one or more processors or servers 160, ABAC administration system 162, policy/tag information system 164, multi-tenant attribute (tag) storage system 166 (which, itself, illustratively includes tenant stores 168-170 which store attribute mappings 172-174, respectively, that map attributes or tags to different users, computer system resources, devices, environments, data, etc.—hereinafter collectively referred to as resources), multi-tenant policy resource/storage system 176, trusted execution environment 178, which includes policy decision system 180. ABAC computing system 116 can include a wide variety of other items 182 as well.

As shown in FIG. 1, multi-tenant policy resource/storage system 176 illustratively includes a set of tenant-specific policy stores 184-186. In one example, the policies that are stored in tenant-specific policy stores 184-186 can be expressed and modified by users in a standard language. The individual policies are illustratively secured and accessible only to members of a specific administrative role. Thus, the policies are (or can be) tenant-specific and accessed only by the tenant administrator. Thus, there is no commingling of policies of different tenants. Also, the policies can illustratively be imported and exported using a standards-based format. These are examples only. The policies illustratively define how access will be granted, given the various attributes or tags that are involved in the mappings relevant to any particular decision.

Trusted execution environment 178 illustratively transmits and receives information in encrypted form. It prevents unauthorized users (even administrative users) from gaining access to information in environment 178.

Policy decision system 182 illustratively includes workload request processor 188, policy loading system 190, attribute (tag) loading system 192, process decision engine 194, and it can include environment clean up system 196, as well as other items 198. Policy decision system 182 illustratively receives the relevant policies (that are related to an access request 118) along with the relevant tags or attributes. In one example, all or part of system 182 is a cloud-based service that is illustrated in trusted execution environment on a per-tenant basis. Workload request processor 188 determines what policies are relevant, and what tags or attributes are included in the access request, and which ones need to be obtained from multi-tenant attribute storage system 166. Policy loading system 190 accesses the multi-tenant policy resource/storage system 176 to obtain the relevant policies from the relevant tenant-based policy store 184-186. It loads them into process decision engine 194. Attribute (tag) loading system 192 accesses the multi-tenant attribute storage system 166 to obtain any additional attributes or tags that are needed by engine 194, and that were not provided by the access request 118. Process decision engine 194 then executes the relevant policies that have been loaded, given the tags or attributes that have been loaded, and generates a response 120. In one example, response 120 not only indicates whether the requested access is granted or denied, but it may indicate which particular operations are permitted, when access is granted.

Environment clean up system 196 then cleans up the environment by deleting, in a secured way, any policies and attributes or tags and any other artifacts or information generated during the decision-making process. This is done so that no surreptitious access can be gained to that information.

Figure 2:
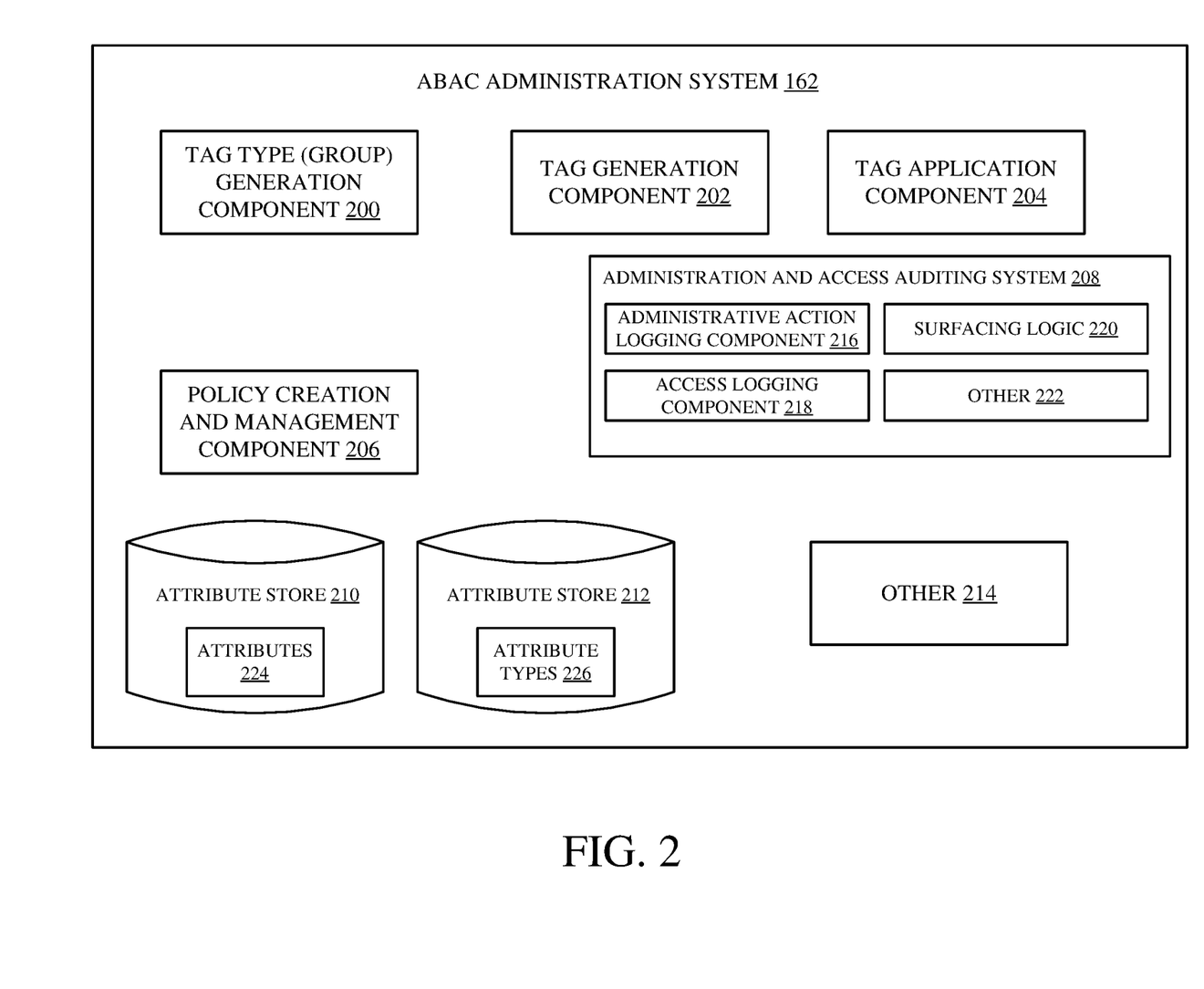
FIG. 2 is a block diagram showing one example of an attribute-based access control administration system, in more detail.

FIG. 2 is a block diagram showing one example of the ABAC administration system 162, in more detail. In one example, ABAC administration system 162 can isolate administration of data and resource attributes from user attributes. This can be done by separating administrative roles to inhibit an administrator of data from manipulating the attributes of users, for example. System 162 can also allow other administrative functions, other than those described herein. FIG. 2 shows that system 162 can include tag type (or group) generation component 200, tag generation component 202, tag application component 204, policy creation and management component 206, administration and access auditing system 208, attribute store 210, attribute type store 212, and it can include other items 214. Administration and access auditing system 208 can include administrative access logging component 216, access logging component 218, surfacing logic 220, and it can include other items 222. Attribute store 210 can include attributes 224, and attribute type store 212 can include attribute types 226.

Tag type generation component 200 illustratively surfaces an interface that allows an administrative user (through administrative interaction 122) to define certain types or groups of tags. Tag generation component 202 surfaces an interface that allows an administrative user to generate those tags, and tag application component 204 allows an administrative user to apply those tags to the different entities to which they correspond. For instance, component 204 allows an administrative user to apply tags to users, data, resources, environments, devices, etc.

Policy creation and management component 206 illustratively allows an administrative user to generate and manage policies. The user can illustratively create, revise, update, and delete policies using component 206. The attributes that are generated can be stored as attributes 225 in data store 210, and the attribute types that are generated can be stored in attribute type store 212 as attribute types 226.

Administration and auditing system 208 illustratively logs a variety of different information that indicates the type of administrative actions that have been taken in ABAC computing system 116 as well as the types of data access requests and processing operations that have been taken. Administrative action logging component 216 determines when administrative actions are requested and taken, and logs information indicative of those operations. Access logging component 218 determines when access operations are being performed and logs data indicative of those access operations. Surfacing logic 220 allows the logged information to be surfaced for auditing or other purposes.

Figure 3:
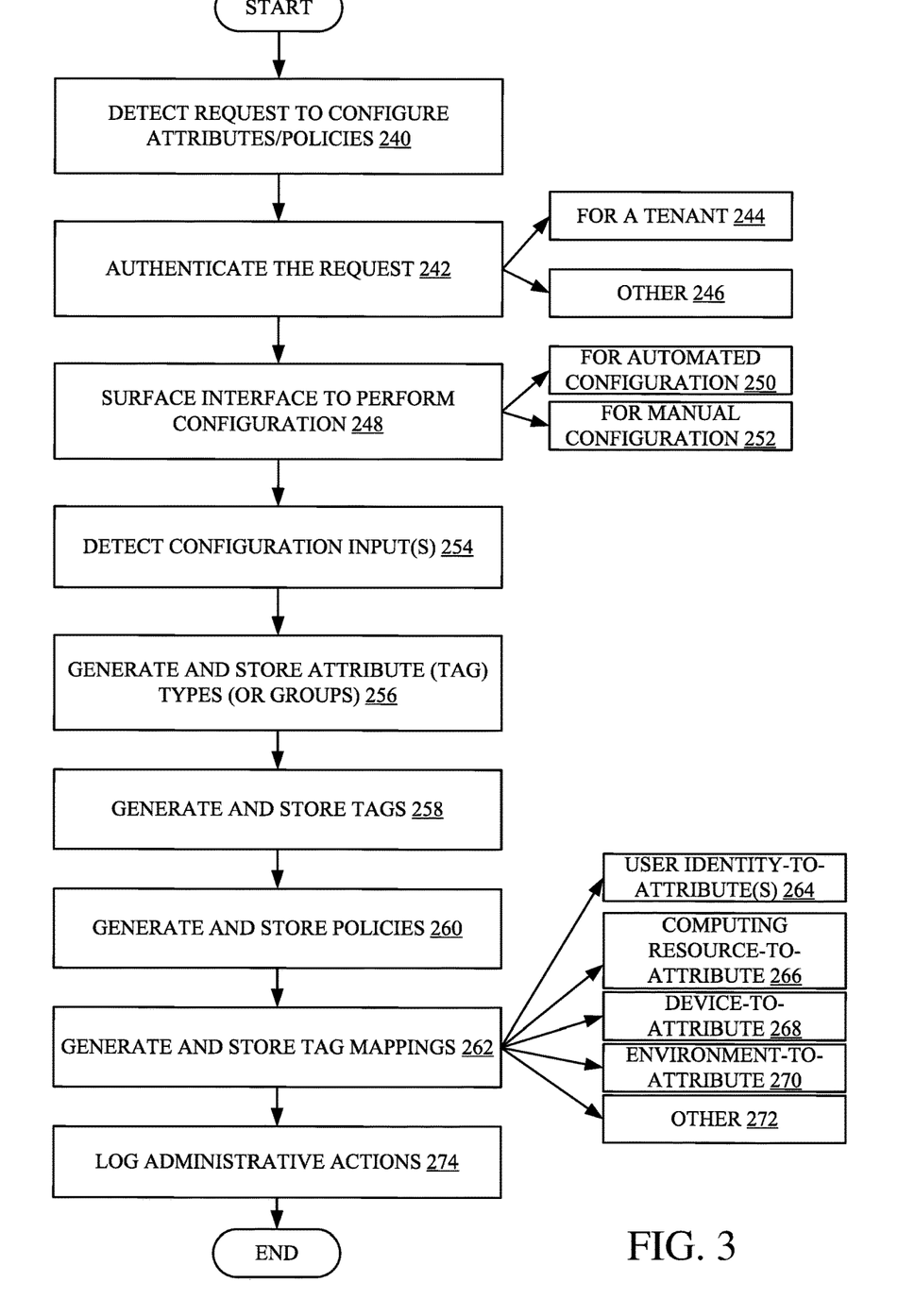
FIG. 3 is a flow diagram showing one example of the operation of the ABAC administration system, in more detail.

FIG. 3 is a flow diagram illustrating one example of the operation of ABAC administration system 162, in more detail. System 162 first detects a request to configure attributes and/or policies for a particular tenant. This is indicated by block 240 in the flow diagram of FIG. 3. System 162 can use its own authentication system, or a separate authentication system to authenticate the request. This is indicated by block 242. For instance, it may authenticate that the requesting administrator is authenticated for the tenant to which it is requesting access. This is indicated by block 244. It can authenticate the request in other ways as well, and this is indicated by block 246.

The particular component that is being used then surfaces an interface to perform configuration. This is indicated by block 248. In one example, it may be that an administrator is asking to automatically download a plurality of tags or attributes, or mappings or policies to ABAC computing system 116. Thus, the interface that is surfaced may be for automated configuration, as indicated by block 250. It may be that the administrator is requesting to perform manual configuration, in which case an appropriate interface is surfaced for manual configuration. This is indicated by block 252.

The surfaced interface then detects configuration inputs to perform configuration. This is indicated by block 254. For instance, where tag or attribute types are being generated with the configuration inputs, then component 200 generates those types and stores them in attribute type store 212. This is indicated by block 256. Where the tags (or attributes), themselves are being generated, then component 202 generates and stores the tags or attributes in attribute store 210. This is indicated by block 258.

Where policies are being created or managed, then component 206 generates or modifies and stores those policies (or modifications) in the multi-tenant policy resource/storage system 176, in the corresponding tenant policy store 184-186 (shown in FIG. 2). This is indicated by block 260 in the flow diagram of FIG. 3.

Where the administrator is generating mappings of attributes or tags to different entities, then component 204 generates and stores the tag mappings. This is indicated by block 262. The tag mappings can be user identity-to-attribute mappings 264, computing system resource-to-attribute mappings 266, device-to-attribute mappings 268, environment-to-attribute mappings 270, or they can include a wide variety of other resource-to-attribute mappings 272.

Administrative action logging component 216 then logs all the administrative actions that were just performed. This is indicated by block 274 in the flow diagram of FIG. 3.

Policy/tag information system 164 illustratively supports a search interface that can be accessed by an administrator (or other authorized person) to identify the tags and policies that are currently in place. For instance, system 164 can receive a request to identify all tags that have been applied to a specific user, or group of users, to a computing system resource, to an environment, to a device, to any other resources, etc. it can identify those tags and return a response to that request. It can also illustratively receive a request to identify relevant policies, given certain inputs or criteria. It can search the multi-tenant policy resource/storage system 176 to identify those policies and generate a response indicative of the relevant policies. Policy/tag information system 164 can be used to obtain other information about tags and policies as well, and those mentioned are mentioned for the sake of example only.

Figure 4:
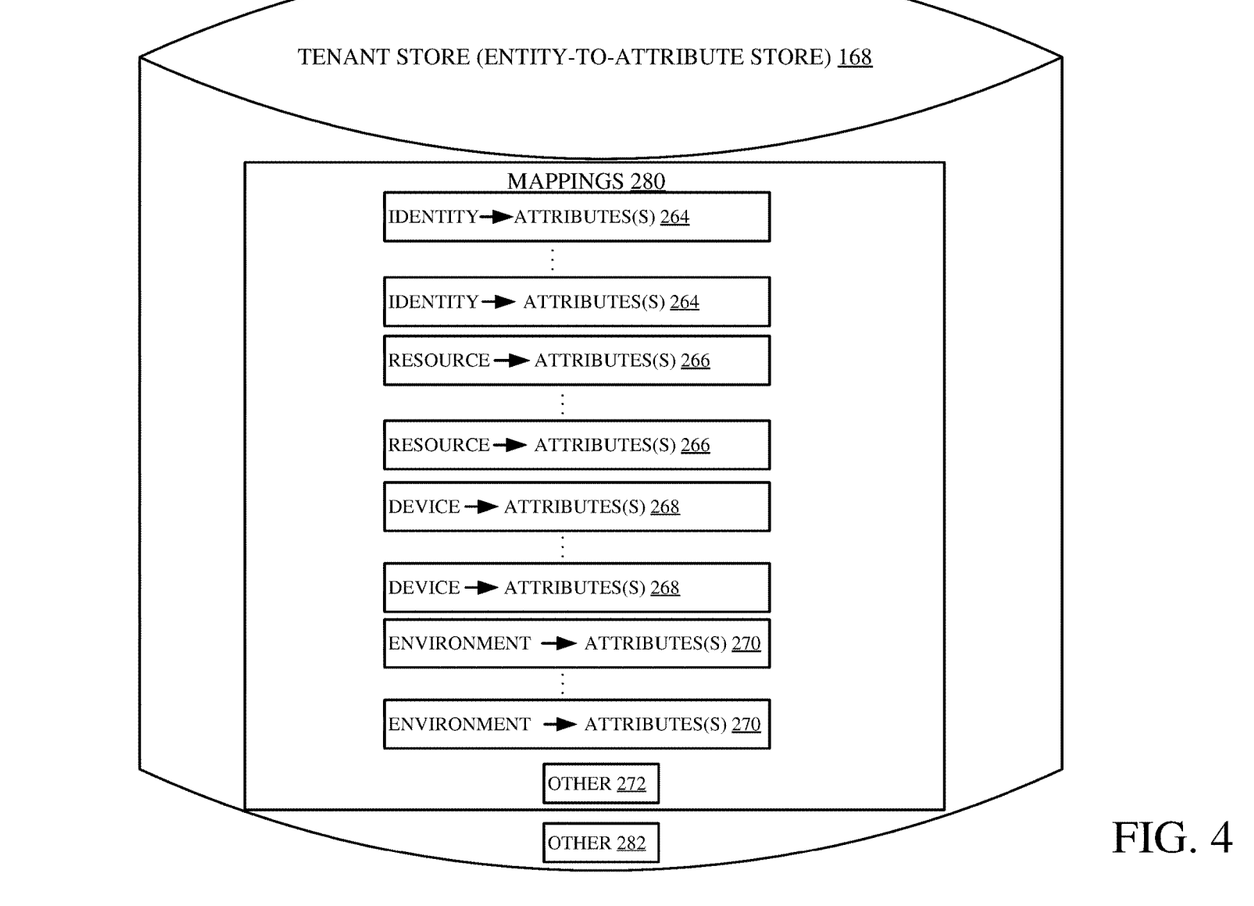
FIG. 4 is a block diagram showing one example of a tenant store that stores identity-to-attribute mappings.

FIG. 4 is a block diagram showing one example of a tenant store 168, in more detail. It can be seen that tenant store 168 includes a plurality of different entity-to-attribute mappings 280. The mappings can include, for instance, the user identity-to-attribute mappings 264, resource-to-attribute mappings 266, device-to-attribute mappings 268, environment-to-attribute mappings 270, or any of a wide variety of other attribute mappings 272. The tenant store 168 can include other items 282, as well.

Figure 5:
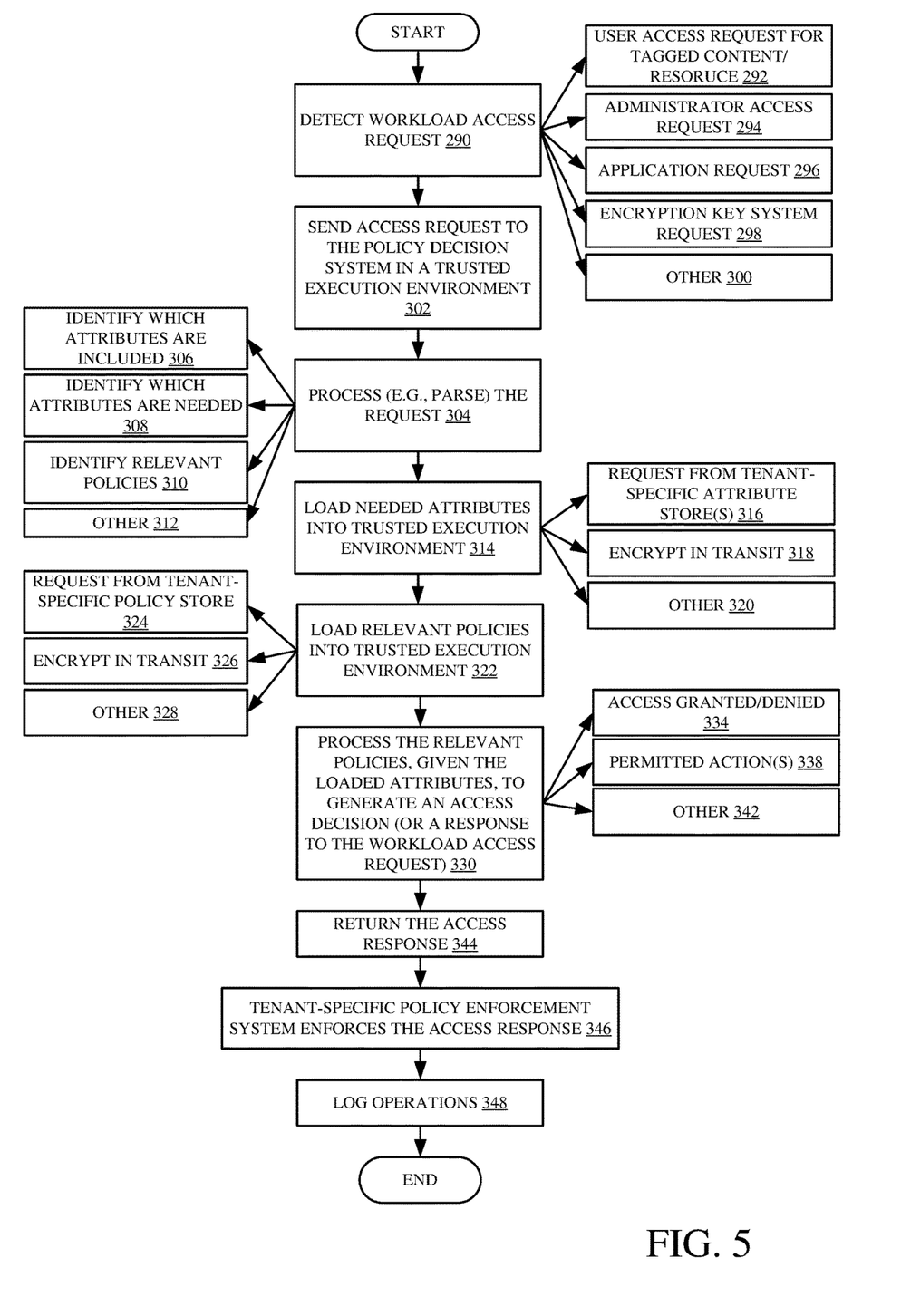
FIG. 5 is a flow diagram showing one example of the operation of the ABAC computing system, in more detail.

FIG. 5 is a flow diagram illustrating one example of the operation of ABAC computing system 116 in receiving an access request, and generating a response to that access request. It is first assumed that ABAC computing system 116 detects an access request from a workload, requesting access to a resource (such as data, a piece of cloud infrastructure, etc.). This is indicated by block 290 in the flow diagram of FIG. 5. As mentioned above, the access request may be a user access request for an item of tagged content or a tagged resource (that is tagged with attributes). This is indicated by block 292. The access request may be an administrator access request to configure attributes or policies, or for other administrative purposes. This is indicated by block 294. The workload requesting access may be an application on multi-tenant computing system 102. This is indicated by block 296. It may come from encryption key computing system 135, as indicated by block 298 in the flow diagram of FIG. 5. The workload access request may be any of a wide variety of other access requests as well. This is indicated by block 300.

ABAC computing system 116 forwards the access request 118 to the policy decision system 180 in the trusted execution environment 178. This is indicated by block 302 in the flow diagram of FIG. 5.

Workload request processor 188 processes the access request 118 to determine what items are being accessed, who is accessing them, whether attributes or tags are provided, etc. Processing the request is indicated by block 304 in the flow diagram of FIG. 5. In one example, workload request processor 188 parses the request to identify which attributes, if any, are included along with the request. This is indicated by block 306 in the flow diagram of FIG. 5. For instance, the request may include the identity of the requestor, along with any tags or attributes that are mapped to that requestor. It may include a content identifier identifying the content for which access is requested, along with the tags or attributes mapped to that item of content. It may include environment data, indicating the environment where the content resides, and tags or attributes corresponding to the environment among other things. Workload request processor 188 illustratively identifies which attributes are included with the request. It also identifies which attributes are still needed (e.g., not included with the request). This is indicated by block 308. It may be that the access request 118 includes some of the needed tags or attributes, but not all of them. Thus, processor 188 identifies any tags or attributes that still need to be obtained.

Workload request processor 188 also illustratively identifies any relevant policies that are to be referred to in generating the response 120 to the access request 118. The relevant policies may be identified in the access request 118, or they may need to be obtained. Identifying the relevant policies is indicated by block 310. The identity of the relevant policies may also be derived from other information in the request (such as who is making the request, the data or resources being requested, etc.). The request can be processed in a wide variety of other ways as well, and this is indicated by block 312 in the flow diagram of FIG. 5.

If any tags or attributes are still needed, then attribute (tag) loading system 192 loads any needed tags into the trusted execution environment so that they can be accessed by process decision engine 194. Loading the tags is indicated by block 314 in the flow diagram of FIG. 5. Policy loading system 190 can request the tags from the multi-tenant attribute (or tag) storage system 166. This is indicated by block 316 in the flow diagram of FIG. 5. In one example, the tags are encrypted in transit to and from trusted execution environment 178, to maintain their secure integrity. This is indicated by block 318. The tags can be loaded in other ways as well, and this is indicated by block 320.

Policy loading system 190 then loads the relevant policies into the trusted execution environment 178, so they can be accessed by process decision engine 194. Loading the relevant policies is indicated by block 322 in the flow diagram of FIG. 5. In one example, system 192 can request the relevant policies from multi-tenant policy resource/storage system 176. This is indicated by block 324 in the flow diagram of FIG. 5. The decision can be made based on one attribute or any combination of attributes (such as any combination of requestor attributes, resource attributes, device attributes, environmental attributes, etc.). The policies can also be encrypted in transit to and from trusted execution environment 178. This is indicated by block 326. The policies can be loaded in other ways as well, and this is indicated by block 328.

Figure 6:
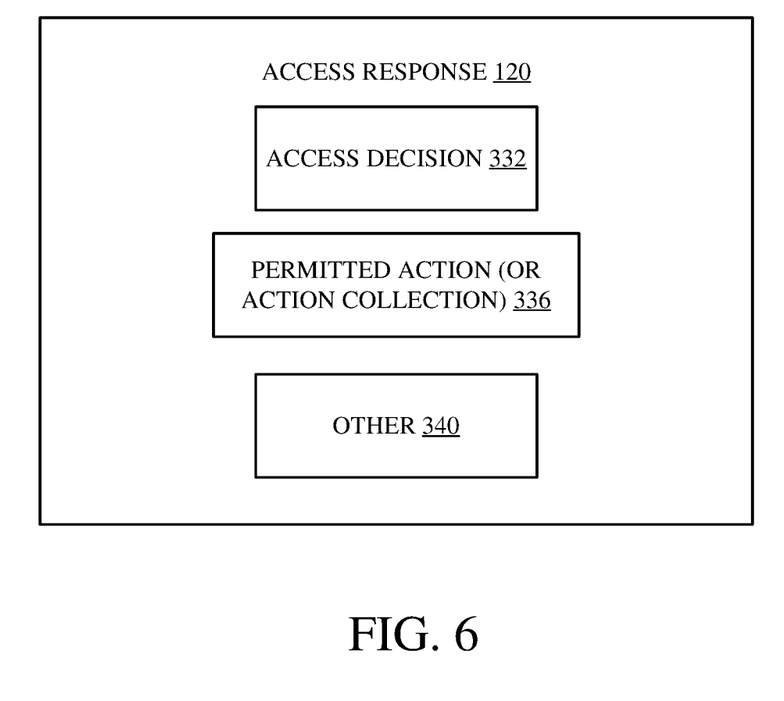
FIG. 6 is a block diagram showing one example of an access response, in more detail.

Process decision engine 194 then processes the relevant policies, given the loaded attributes, to generate an access decision (or a response 120) based on the workload access request 118. This is indicated by block 330 in the flow diagram of FIG. 5. One example of an access decision (or response) 120 is illustrated in FIG. 6. It can be seen that response 120 illustratively includes an access decision 332 indicating whether the access is granted or denied. This is also indicated by block 334 in the flow diagram of FIG. 5.

The access response 120 may include an identifier that identifies permitted actions (or collections of actions) 336. This is also indicated by block 338. The access response 120 can include a wide variety of other items 340. This is indicated by block 342 in the flow diagram of FIG. 5.

Process decision engine 194 then returns the response 120 to the multi-tenant computing system 102, and to the workload that requested it. In one example, this is done through access request interaction component 158 in access management system 130 on multi-tenant computing system 102. Returning the access response 120 is indicated by block 344 in the flow diagram of FIG. 5.

Tenant-specific policy enforcement system 152 then enforces the access decision (or response) 120 that it receives from ABAC computing system 116. Enforcing the access decision (or response) 120 is indicated by block 346 in the flow diagram of FIG. 5. As discussed above, this can be done in a variety of different ways, depending on the type of workload that requested it, and depending upon the particular tenant that that workload resides in.

Administration and access auditing system 208 (shown in FIG. 2) then logs the operations that have just been performed by ABAC computing system 116 in receiving the access request 118 and generating the response 120. This is indicated by block 348 in the flow diagram of FIG. 5. For instance, it can log information indicating the workload that generated the request 118, the resources for which access was requested, the time the access request was received, the decision, the polices used to generate the decision, and a wide variety of other information.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
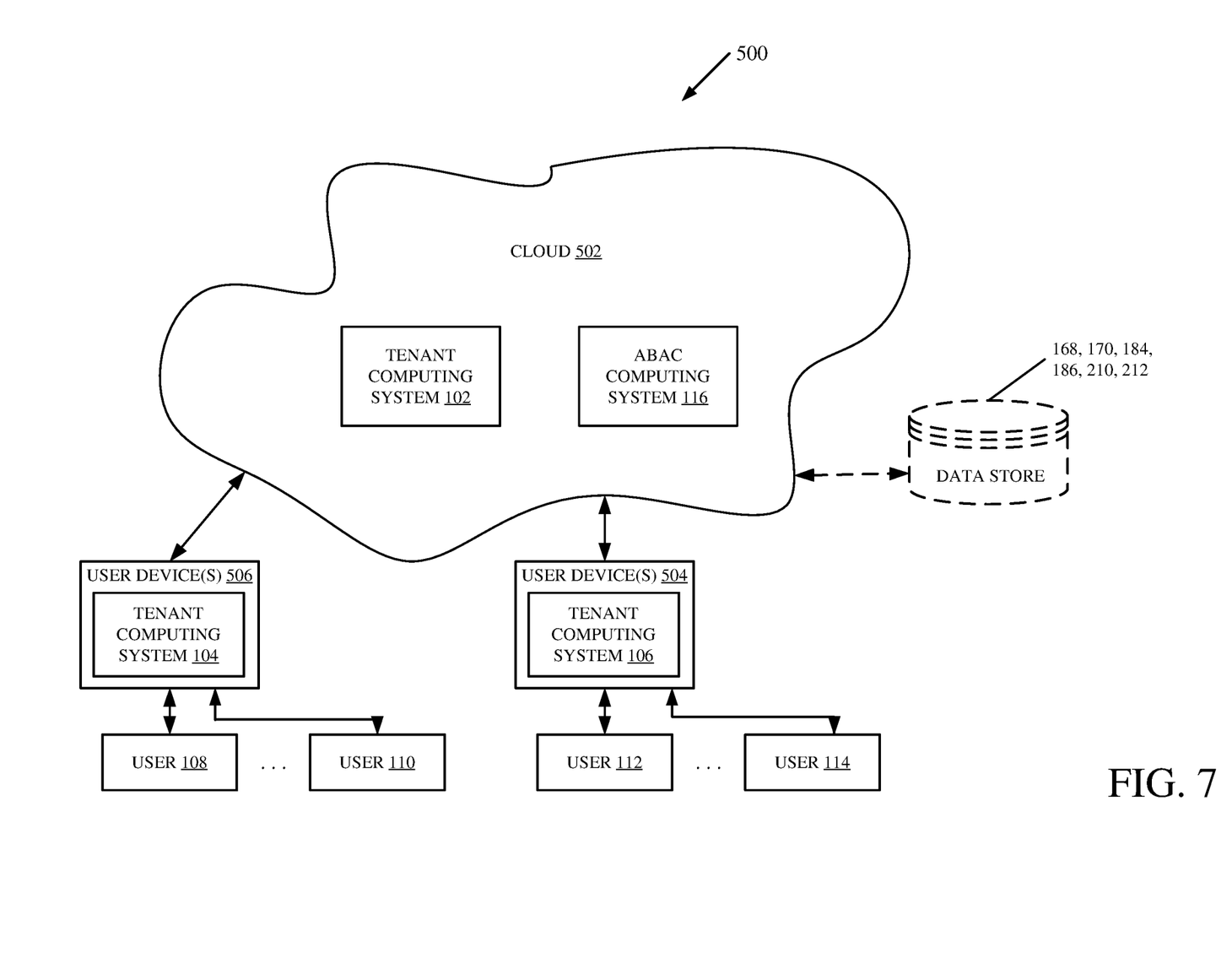
FIG. 7 is a block diagram showing one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing systems 102 and 116 can be located in cloud 502 (which can be public, private, or a combination where portions are public while others are private). Therefore, users 108-114 use a user devices 504-506 to access those systems through cloud 502.

FIG. 7 also depicts another example of a cloud architecture. FIG. 7 shows that it is also contemplated that some elements of computing systems 102 and 116 can be disposed in cloud 502 while others are not. By way of example, data stores 168, 170, 184, 186, 210 and 212 can be disposed outside of cloud 502, and accessed through cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
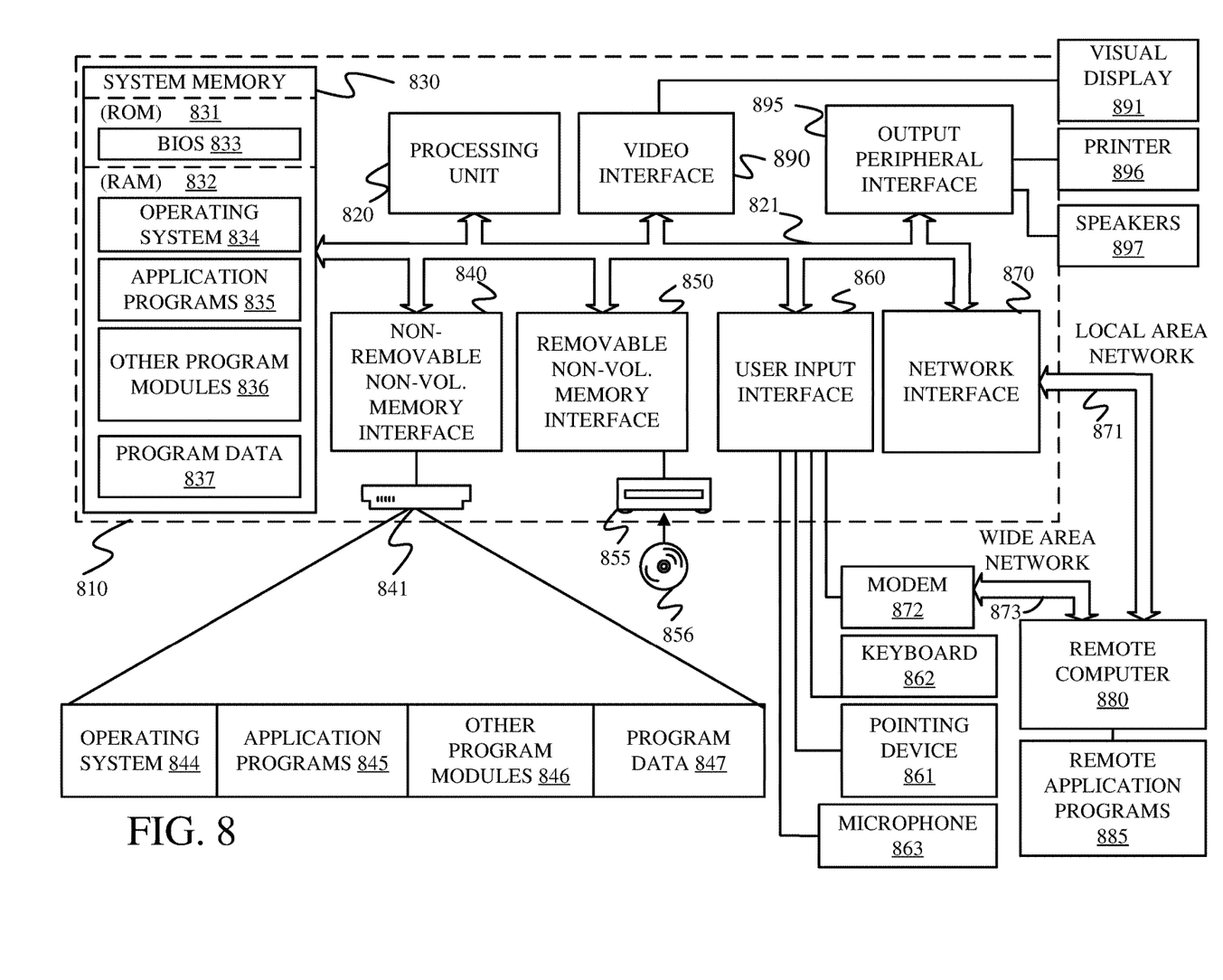
FIG. 8 is a block diagram showing one example of a computing environment that can be used in the architectures illustrated in the previous figures.

FIG. 8 is one example of a computing environment in which architecture 100, or parts of it, (for example) can be deployed. With reference to FIG. 8, an example system for implementing some examples include a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer implemented method, comprising:

receiving an access request from a workload in a multi-tenant computing system, the access request being indicative of a requestor requesting access to a resource;

identifying a set of requestor attributes corresponding to the requestor and a set of resource attributes corresponding to the resource;

identifying a relevant tenant-specific data access policy; and obtaining the relevant tenant-specific data access policy from a multi-tenant policy storage system;

generating an access decision indicative of whether the requested access is granted based on the set of requestor attributes, the set of resource attributes and the relevant tenant-specific data access policy; and returning the access decision to the workload.

Example 2 is the computer implemented method of any or all previous examples wherein obtaining the relevant tenant-specific access policy comprises:

obtaining the relevant tenant-specific access policy from the multi-tenant policy storage system in encrypted form; and decrypting the relevant tenant-specific access policy.

Example 3 is the computer implemented method of any or all previous examples, and further comprising:

determining whether any of the set of requestor attributes or the set of resource attributes are included with the access request; and if not, obtaining any of the set of requestor attributes and the set of resource attributes that are not included with the access request.

Example 4 is the computer implemented method of any or all previous examples wherein obtaining any of the set of requestor attributes and the set of resource attributes that are not included in the access request, comprises:

obtaining any of the set of requestor attributes that are not included with the access request from a multi-tenant attribute storage system that segments attributes corresponding to different tenants.

Example 5 is the computer implemented method of any or all previous examples wherein obtaining any of the set of requestor attributes and the set of resource attributes that are not included in the access request, comprises:

obtaining any of the set of resource attributes that are not included in the access request from the multi-tenant attribute storage system that segments attributes corresponding to different tenants.

Example 6 is the computer implemented method of any or all previous examples wherein generating the access decision comprises:

obtaining a set of environment attributes corresponding to an environment in which the workload operates;

obtaining a set of device attributes corresponding to a device from which the access request was originated; and generating the access decision based on the environment attributes and the device attributes.

Example 7 is the computer implemented method of any or all previous examples and further comprising:

generating a user interface with a user actuatable tag type generation input mechanism;

detecting user actuation of the tag type generation input mechanism indicative of a tag type; and storing the tag type in a tag type store.

Example 8 is the computer implemented method of any or all previous examples and further comprising:

generating a user interface with user actuatable tag generation input mechanism;

detecting user actuation of the tag generation input mechanism indicative of a tag of a given tag type; and storing the tag in a tag store.

Example 9 is the computer implemented method of any or all previous examples and further comprising:

generating a user interface with user actuatable tag mapping input mechanism;

detecting user actuation of the tag mapping input mechanism indicative of a mapping between a tag of a tag type to a resource identity; and storing the mapping in the multi-tenant attribute storage system.

Example 10 is the computer implemented method of any or all previous examples wherein the resource identity identifies one of a user, a device, an environment, or a computing system resource.

Example 11 is the computer implemented method of any or all previous examples wherein generating the access decision comprises:

generating the access decision to include a set of permitted actions that are permitted for the access requested.

Example 12 is a computer system, comprising:

one or more processors;

memory that stores instructions which, when executed by the one or more processors, cause the one or more processors to perform steps, comprising:

receiving an access request from a workload in a multi-tenant computing system, the access request being indicative of a requestor requesting access to a resource;

obtaining a set of requestor attributes corresponding to the requestor and a set of resource attributes corresponding to the resource, from a multi-tenant attribute storage system;

identifying a relevant tenant-specific data access policy; and obtaining the relevant tenant-specific data access policy from a multi-tenant policy storage system;

generating an access decision indicative of whether the requested access is granted based on the set of requestor attributes, the set of resource attributes and the relevant tenant-specific data access policy; and returning the access decision to the workload.

Example 13 is the computer system of any or all previous examples wherein obtaining the relevant tenant-specific access policy comprises:

obtaining the relevant tenant-specific access policy from the multi-tenant policy storage system in encrypted form; and decrypting the relevant tenant-specific access policy.

Example 14 is the computer system of any or all previous examples wherein generating the access decision comprises:

obtaining a set of environment attributes corresponding to an environment in which the workload operates;

obtaining a set of device attributes corresponding to a device from which the access request was originated; and generating the access decision based on the environment attributes and the device attributes.

Example 15 is the computer system of any or all previous examples and further comprising:

generating a user interface with a user actuatable tag type generation input mechanism;

detecting user actuation of the tag type generation input mechanism indicative of a tag type; and storing the tag type in a tag type store.

Example 16 is the computer system of any or all previous examples and further comprising:

generating a user interface with user actuatable tag generation input mechanism;

detecting user actuation of the tag generation input mechanism indicative of a tag of a given tag type; and storing the tag in a tag store.

Example 17 is the computer system of any or all previous examples and further comprising:

generating a user interface with user actuatable tag mapping input mechanism;

detecting user actuation of the tag mapping input mechanism indicative of a mapping between a tag of a tag type to a resource identity; and storing the mapping in the multi-tenant attribute storage system.

Example 18 is the computer system of any or all previous examples wherein the resource identity identifies one of a user, a device, an environment, or a computing system resource.

Example 19 is a computing system, comprising:

a multi-tenant policy storage system that stores tenant-specific data access policies in tenant-specific data stores;

a workload request processor that receives an access request from a workload in a multi-tenant computing system, the access request being indicative of a requestor requesting access to a resource, the workload request processor identifying a set of requestor attributes corresponding to the requestor and a set of resource attributes corresponding to the resource, and a relevant tenant-specific data access policy; and an access decision engine that obtains the set of requestor attributes, the set of resource attributes and the relevant tenant-specific data access policy, and generates an access decision indicative of whether the requested access is granted based on the set of requestor attributes, the set of resource attributes and the relevant tenant-specific data access policy, and returns the access decision to the workload.

Example 20 is the computing system of any or all previous examples and further comprising:

an administration system configured to generate a user interface with a user actuatable tag type generation input mechanism, detect user actuation of the tag type generation input mechanism indicative of a tag type, generate a user interface with user actuatable tag generation input mechanism, detect user actuation of the tag generation input mechanism indicative of a tag of a given tag type, generate a user interface with user actuatable tag mapping input mechanism, and detect user actuation of the tag mapping input mechanism indicative of a mapping between a tag of a tag type to a resource identity; and a data store configured to store the tag type, the tag and the tag mapping.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving an access request from a workload in a multi-tenant computing system that includes a plurality of tenants, the access request being indicative of a requestor requesting access to a resource;
parsing, by a tenant-specific execution environment that is specific to a particular tenant associated with the requestor, the access request to identify a requestor attribute corresponding to the requestor and a resource attribute corresponding to the resource;
selecting, based on information in the access request, a tenant-specific data access policy from a set of data access policies, the selected tenant-specific data access policy being specific to the particular tenant;
accessing a multi-tenant policy storage system that includes a plurality of tenant-specific policy stores, wherein
each tenant-specific policy store of the plurality of tenant-specific policies stores:
corresponds to respective tenant of the plurality of tenants, and
stores a set of tenant-specific data access policies, for the respective tenant, separate from data access policies for other tenants;
obtaining the selected tenant-specific data access policy from the tenant-specific policy store corresponding to the particular tenant;
loading the selected tenant-specific data access policy into the tenant-specific execution environment;
generating, by the tenant-specific execution environment, an access decision indicative of whether the requested access is granted based on the requestor attribute, the resource attribute, and the selected tenant-specific data access policy; and
returning the access decision to the workload.

2. The computer implemented method of claim 1 wherein obtaining the selected tenant-specific data access policy comprises:
obtaining the selected tenant-specific data access policy from the multi-tenant policy storage system in encrypted form; and decrypting the selected tenant-specific data access policy.

3. The computer implemented method of claim 1, and further comprising:
based on determining that one or more of the requestor attribute or the resource attribute are not included with the access request, obtaining the one or more of the requestor attribute or the resource attribute that are not included with the access request.

4. The computer implemented method of claim 3 wherein obtaining one or more of the requestor attribute or the resource attribute that are not included in the access request comprises:
obtaining the requestor attribute from a multi-tenant attribute storage system that segments attributes corresponding to different tenants.

5. The computer implemented method of claim 3 wherein obtaining one or more of the requestor attribute or the resource attribute that are not included in the access request comprises:
obtaining the resource attribute from a multi-tenant attribute storage system that segments attributes corresponding to different tenants.

6. The computer implemented method of claim 1 wherein generating the access decision comprises:
obtaining an environment attribute corresponding to an environment in which the workload operates;
obtaining a device attribute corresponding to a device from which the access request was originated; and
generating the access decision based on the environment attribute and the device attribute.

7. The computer implemented method of claim 1 and further comprising:
generating a user interface with a user actuatable tag type generation input mechanism;
detecting user actuation of the tag type generation input mechanism indicative of a tag type; and
storing the tag type in a tag type store.

8. The computer implemented method of claim 1, wherein each tenant of the plurality of tenants has a plurality of users,
the multi-tenant computing system hosts a service for the plurality of users of the plurality of tenants, and
generating the access decision comprises generating the access decision to include a set of permitted actions that are permitted for the requested access.

9. The computer implemented method of claim 5 and further comprising:
generating a user interface with a user actuatable tag mapping input mechanism;
detecting user actuation of the tag mapping input mechanism indicative of a mapping between a tag of a tag type to a resource identity, wherein the resource identity identifies one of a user, a device, an environment, or a computing system resource; and
storing the mapping in the multi-tenant attribute storage system.

10. The computer implemented method of claim 1, wherein
obtaining the selected tenant-specific data access policy comprises accessing a set of mappings corresponding to the particular tenant, which each mapping of the set of mappings maps a tag of a tag type to a resource identity,
generating the access decision comprises generating the access decision based on the set of mapping corresponding to the particular tenant, and
the resource identity identifies one or more of a user, a device, an environment, or a computing system resource.

11. A computing system comprising:
at least one processor; and
memory that stores instructions executable by the at least one processor, wherein the instructions, when executed, cause the computing system to:
receive an access request from a workload in a multi-tenant computing system that includes a plurality of tenants, the access request being indicative of a requestor requesting access to a resource;
parse, by a tenant-specific execution environment that is specific to a particular tenant associated with the requestor, the access request to identify
a requestor attribute corresponding to the requestor, and
a resource attribute corresponding to the resource;
select, based on information in the access request, a tenant-specific data access policy from a set of data access policies, the selected tenant-specific data access policy being specific to the particular tenant;
access a multi-tenant policy storage system that includes a plurality of tenant-specific policy stores, wherein
each tenant-specific policy store of the plurality of tenant-specific policies stores:
corresponds to a respective tenant of the plurality of tenants, and
stores a set of tenant-specific data access policies, for the respective tenant, separate from data access policies for other tenants;
obtain the selected tenant-specific data access policy from the tenant-specific policy store corresponding to the particular tenant;
load the selected tenant-specific data access policy into the tenant-specific execution environment;
generate, by the tenant-specific execution environment, an access decision indicating that the requested access is granted based on:
the requestor attribute,
the resource attribute, and
the selected tenant-specific data access policy; and
return the access decision to the workload.

12. The computing system of claim 11, wherein the instructions, when executed, cause the computing system to:
obtain the selected tenant-specific data access policy from the multi-tenant policy storage system in encrypted form; and
decrypt the selected tenant-specific data access policy.

13. The computing system of claim 11, wherein the instructions, when executed, cause the computing system to:
based on a determination that one or more of the requestor attribute or the resource attribute are not included with the access request, obtain the one or more of the requestor attribute or the resource attribute that are not included with the access request.

14. The computing system of claim 13, wherein the instructions, when executed, cause the computing system to:
obtain the requestor attribute from a multi-tenant attribute storage system that segments attributes corresponding to different tenants.

15. The computing system of claim 13, wherein the instructions, when executed, cause the computing system to:
obtain the resource attribute from a multi-tenant attribute storage system that segments attributes corresponding to different tenants.

16. The computing system of claim 11, wherein the instructions, when executed, cause the computing system to:
  obtain an environment attribute corresponding to an environment in which the workload operates;
  obtain a device attribute corresponding to a device from which the access request was originated; and
  generate the access decision based on the environment attribute and the device attribute.

17. The computing system of claim 11, wherein the instructions, when executed, cause the computing system to:
  generate a user interface with a user actuatable tag type generation input mechanism;
  detect user actuation of the tag type generation input mechanism indicative of a tag type; and
  store the tag type in a tag type store.

18. The computing system of claim 11, wherein each tenant of the plurality of tenants has a plurality of users,
  the multi-tenant computing system hosts a service for the plurality of users of the plurality of tenants, and
  the instructions, when executed, cause the computing system to generate the access decision to include a set of permitted actions that are permitted for the requested access.

19. The computing system of claim 15, wherein the instructions, when executed, cause the computing system to:
  generate a user interface with user actuatable tag mapping input mechanism;
  detect user actuation of the tag mapping input mechanism indicative of a mapping between a tag of a tag type to a resource identity, the resource identity identifying one of a user, a device, an environment, or a computing system resource; and
  store the mapping in the multi-tenant attribute storage system.

20. The computing system of claim 11, wherein the instructions, when executed, cause the computing system to:
  obtain the selected tenant-specific data access policy based on a set of mappings corresponding to the particular tenant, which each mapping of the set of mappings maps a tag of a tag type to a resource identity, the resource identity identifying one or more of a user, a device, an environment, or a computing system resource; and
  generate the access decision based on the set of mapping corresponding to the particular tenant.

* * * * *